United States Patent
Duncan et al.

(10) Patent No.: US 10,012,827 B1
(45) Date of Patent: Jul. 3, 2018

(54) SEGMENTED PLANAR IMAGING DETECTOR FOR ELECTRO-OPTIC RECONNAISSANCE (SPIDER) ZOOM

(71) Applicant: LOCKHEED MARTIN CORPORATION, Bethesda, MD (US)

(72) Inventors: Alan L. Duncan, Sunnyvale, CA (US); Richard Lee Kendrick, San Mateo, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 274 days.

(21) Appl. No.: 15/153,594

(22) Filed: May 12, 2016

Related U.S. Application Data (60) Provisional application No. 62/161,773, filed on May 14, 2015.

(51) Int. Cl.
| | | |
|---|---|---|
| G02B 23/00 | (2006.01) | |
| G02B 6/04 | (2006.01) | |
| H04N 5/232 | (2006.01) | |
| H04N 5/225 | (2006.01) | |

(52) U.S. Cl.
CPC ............... *G02B 23/00* (2013.01); *G02B 6/04* (2013.01); *H04N 5/2258* (2013.01); *H04N 5/23296* (2013.01)

(58) Field of Classification Search
CPC ........ G02B 23/00; G02B 6/04; H04N 5/2258; H04N 5/23296
See application file for complete search history.

(56) References Cited

U.S. PATENT DOCUMENTS

| | | | | |
|---|---|---|---|---|
| 4,678,311 A * | 7/1987 | Loce | ................... | G02B 3/0012 355/1 |
| 5,377,287 A * | 12/1994 | Lee | ...................... | G02B 6/2848 385/31 |
| 5,815,624 A * | 9/1998 | Rosenberg | ................ | B60R 1/00 385/115 |
| 8,913,859 B1 * | 12/2014 | Duncan | ................... | G02B 6/06 356/477 |
| 9,304,303 B2 | 4/2016 | Yamamoto | | |
| 9,316,821 B2 | 4/2016 | Kurioka et al. | | |
| 9,754,985 B1 * | 9/2017 | Duncan | ............. | H01L 27/14627 |
| 9,880,342 B2 * | 1/2018 | Vasylyev | ............... | G02B 6/005 |
| 2005/0018947 A1 * | 1/2005 | Li | ....................... | G02B 6/12009 385/14 |
| 2006/0141649 A1 * | 6/2006 | Joyner | ............... | G02B 6/12011 438/31 |

(Continued)

Primary Examiner — Anner N Holder
(74) Attorney, Agent, or Firm — McDermott Will & Emery LLP (57) ABSTRACT

A device for combined-zoom interferometric imaging includes a number of first blades and second blades. Each of the first blades includes multiple first optical elements arranged in a first linear configuration for high-resolution interferometric imaging. Each of the second blades includes multiple second optical elements arranged in a second linear configuration for low-resolution interferometric imaging. Pairs of the first optical elements with different baseline lengths are coupled through a first array of optical waveguides to an optical processor. Pairs of the second optical elements with different baseline lengths are coupled through a second array of optical waveguides to the optical processor.

20 Claims, 10 Drawing Sheets

(56) References Cited

U.S. PATENT DOCUMENTS

2010/0278480 A1* 11/2010 Vasylyev ............... G02B 3/005
385/33
2012/0175496 A1* 7/2012 Vorovitchik ........... G01C 17/34
250/206.2

* cited by examiner

SEGMENTED PLANAR IMAGING DETECTOR FOR ELECTRO-OPTIC RECONNAISSANCE (SPIDER) ZOOM

CROSS-REFERENCE TO RELATED APPLICATIONS

This application claims the benefit of priority under 35 U.S.C. § 119 from U.S. Provisional Patent Application 62/161,773 filed May 14, 2015, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to imaging detectors, and more particularly, to segmented planar imaging detector for electro-optical (EO) reconnaissance (SPIDER) zoom.

BACKGROUND

Many new sensor platforms, such as the Defense Advanced Research Projects Agency (DARPA) Vulture, are being developed. The Vulture is a high altitude, long endurance unmanned aerial vehicle (UAV) that may be used for surveillance. The sensor platforms may require electro-optic (EO) imaging sensors with low mass and power requirements and may also have constrained volume requirements (e.g., they may need to conform primarily to large planar wing surfaces). Conventional EO imaging sensors are unable to meet these constraints without severely limiting their capability (e.g., high resolution imagery capabilities). Space-based space surveillance (SBSS) satellites developed for space situational awareness missions may be too expensive to build and operate.

Space situational awareness missions are seeking more affordable EO sensor systems that can meet wide angle search requirements. More affordable implies reduced mass, volume, and power, while still achieving moderate to large apertures. The purpose of the SPIDER is to provide the performance capability needed by these missions in a radically compressed and low mass and/or low power package. The SPIDER is a telescope that is analogous in form to a flat panel display.

SUMMARY

In some aspects, a device for combined-zoom interferometric imaging includes a number of first blades and second blades. Each of the first blades includes multiple first optical elements arranged in a first linear configuration for high-resolution interferometric imaging. Each of the second blades includes multiple second optical elements arranged in a second linear configuration for low-resolution interferometric imaging. Pairs of the first optical elements with different baseline lengths are coupled through a first array of optical waveguides to an optical processor. Pairs of the second optical elements with different baseline lengths are coupled through a second array of optical waveguides to the optical processor.

In one or more other aspects, an apparatus for compound-zoom interferometric imaging includes multiple first sensor arrays, multiple second sensor arrays, and an optical processor. The first sensor arrays provide a high-resolution image and the second sensor arrays provide a low-resolution image. The optical processor processes optical signals receivable from the first and the second sensor arrays. Each of the first sensor arrays includes a number of first optical elements arranged in a first linear configuration, and each sensor array of the second sensor arrays includes a number of second optical elements arranged in a second linear configuration. Pairs of optical elements with different baseline lengths of the first sensor arrays are coupled through a first array of optical waveguides to the optical processor, and pairs of optical elements with different baseline lengths of the second sensor arrays are coupled through a second array of optical waveguides to the optical processor.

In yet other aspects, a method for providing a compound-zoom imaging device includes arranging a number of first blades including multiple first optical elements in a first linear configuration for high-resolution interferometric imaging. A number of second blades including multiple second optical elements are arranged in a second linear configuration for low-resolution interferometric imaging. Pairs of the first optical elements with different baseline lengths are coupled through a first array of optical waveguides to an optical processor. Pairs of the second optical elements with different baseline lengths are coupled through a second array of optical waveguides to the optical processor.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The present disclosure is directed, in part, to methods and configurations for providing a segmented planar imaging detector for electro-optical (EO) reconnaissance (SPIDER) telescope including multiple short base-line and high-density photonic integrated circuits (PICs). The disclosed SPIDER zoom concept is to enhance the SPIDER design to allow a large field of view, lower-resolution mode that can operate in parallel with a high-resolution and a lower field-of-view spotlight mode. In one aspect, the subject disclosure modifies the high resolution SPIDER PIC cards to include micro-electro-mechanical system (MEMS) steering mirrors to provide a steerable high-resolution spotlight mode while maintaining the required path length control.

SPIDER is a multiple baseline, direct detection interferometric imaging sensor, which uses nano-optics technology including micron scale waveguides, switches, phase modulators, beam combiners, and detectors on a silicon chip. The chip is capable of millions of simultaneous optical interconnects and detections, which involve the equivalent of hundreds of megapixels of image data. The SPIDER design is modular so that the sensing elements can be arrayed in a planar disk or distributed conformally on a large surface such as a UAV wing structure. Existing imaging telescopes with a zoom capability require complex zoom optics with motorized alignment control. The subject technology does not require complex, motorized zoom optics, and instead uses additional photonic integrated circuits that fit in the same volume as the conventional compact imager. The subject disclosure allows a large field-of-view, lower-resolution mode that can operate in parallel with a high-resolution, lower field-of-view spotlight mode.

Figure 1A:
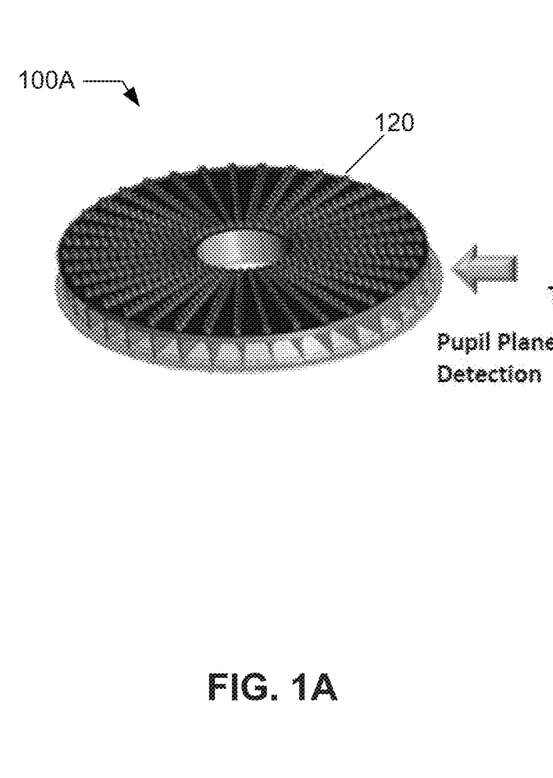
FIGS. 1A-1B are diagrams illustrating examples of a segmented planar imaging detector for electro-optical (EO) reconnaissance (SPIDER) apparatus for interferometric imaging and an existing EO imager.
Figure 1B:
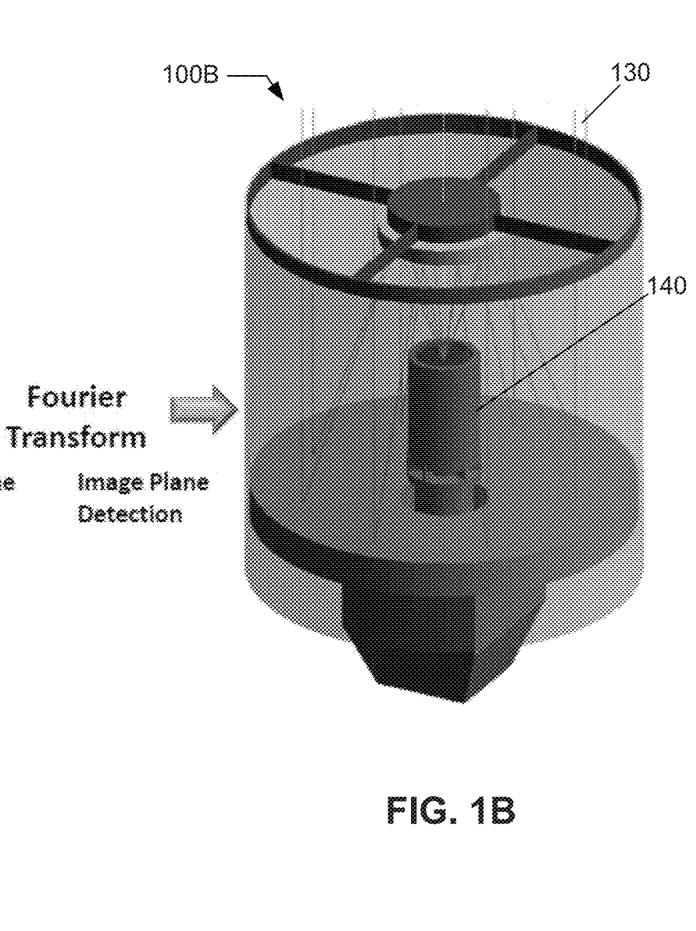

FIGS. 1A-1B are diagrams illustrating examples of a SPIDER apparatus 100A for interferometric imaging and an existing EO imager 100B. The segmented planar imaging detector 100A is part of a SPIDER that can be used for interferometric imaging. The SPIDER apparatus 100A includes an array of blades 120, each including multiple optical elements that are arranged in a linear configuration for high-resolution interferometric imaging. The array of blades, as seen in FIG. 1A, are arranged in a radial configuration, for example, with equal angular separation. The term interferometric imaging refers to formation of an image by lights from pairs of optical elements of each blade coupled through waveguides with unequal distances to an optical processor, as discussed in more details herein. The light detection in the segmented planar imaging detector 100A is performed by measuring complex visibility at a pupil plane via amplitude and phase measurement of the detected light (e.g., the optical signal). The measured complex visibility is used by an image reconstruction algorithm to form a reconstructed image.

FIG. 1B shows an existing EO imager 100B that can focus scene photons (e.g., input light) 130 on an image plane at a focal plane located at some height (e.g., an end) of the tube (e.g., collimator) 140. The EO imager 100B measures an intensity of the input light 130 as received on the focal plane. The optical elements of the of the SPIDER 100A can be thought of as forming elements of a spatial two-dimensional (2-D) Fourier Transform of an image formed on a focal plane (e.g., the focal plane of the EO imager 100B). The SPIDER imager, as shown in FIG. A is substantially less bulkier and lighter than the EO imager 100B and can be enhanced to perform combined-zoom imaging, by allowing simultaneous imaging at high-resolution with a small field-of-view and at low-resolution with a large field of view.

Figure 2A:
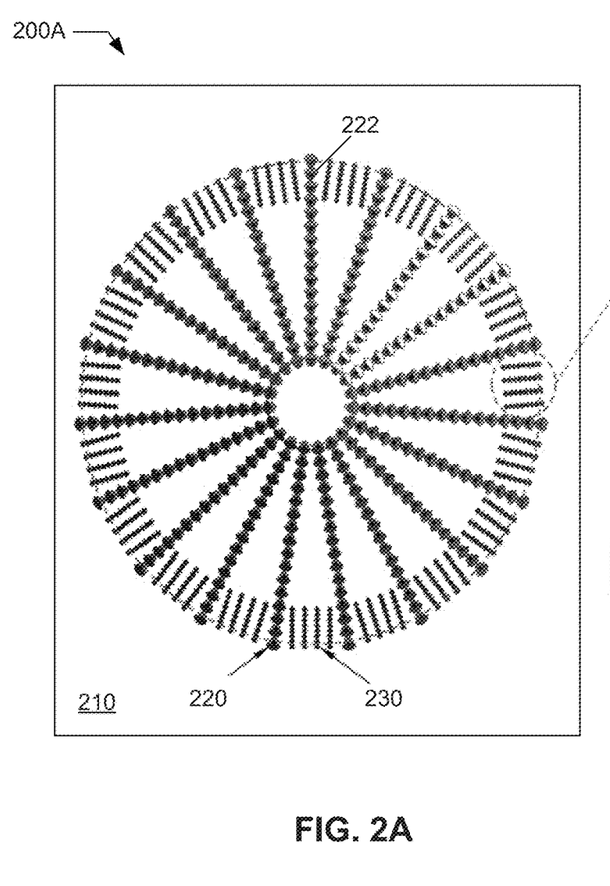
FIGS. 2A-2B are diagrams illustrating a structural and a three-dimensional view of an example of a SPIDER zoom apparatus, according to certain aspects.
Figure 2B:
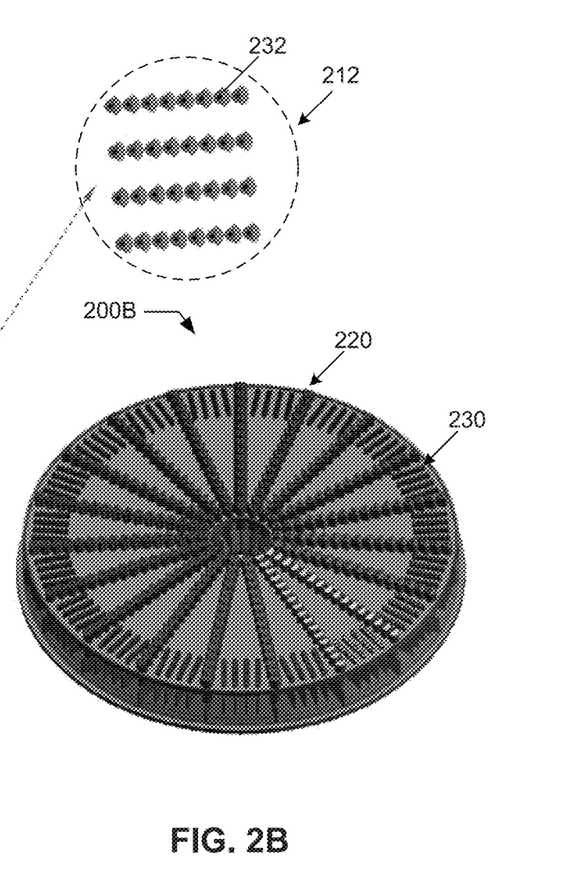

FIGS. 2A-2B are diagrams illustrating a structural view 200A and a three-dimensional (3-D) view 200B of an example of a SPIDER zoom apparatus 210, according to certain aspects. The structural view 200A shows that the SPIDER zoom apparatus 210 includes two kinds of blades, for example, large blades 220 and small blades 230. Each large blade 220 includes a number of (e.g., hundreds) optical elements (e.g., lenslets) 222, and each small blade 230 is an array of optical elements and includes a number of (e.g., tens to hundreds) optical elements (e.g., sensors such as lenslets) 232, as more clearly shown in the blown up portion 212. The large blades 220 are arranged in a radial configuration, for example, with equal angular distances from one another. Multiple (e.g., 4) small blades 230 are positioned in a radial configuration in between two consecutive large blades 220. The small blades 230 may be positioned in a peripheral region of the SPIDER zoom apparatus 210 to take advantage of the gaps between the large blades 220 in the peripheral region. FIG. 2B shows a 3-D view of the SPIDER zoom apparatus 210, further structural details of which are shown in a blown up diagram herein.

Figure 3:
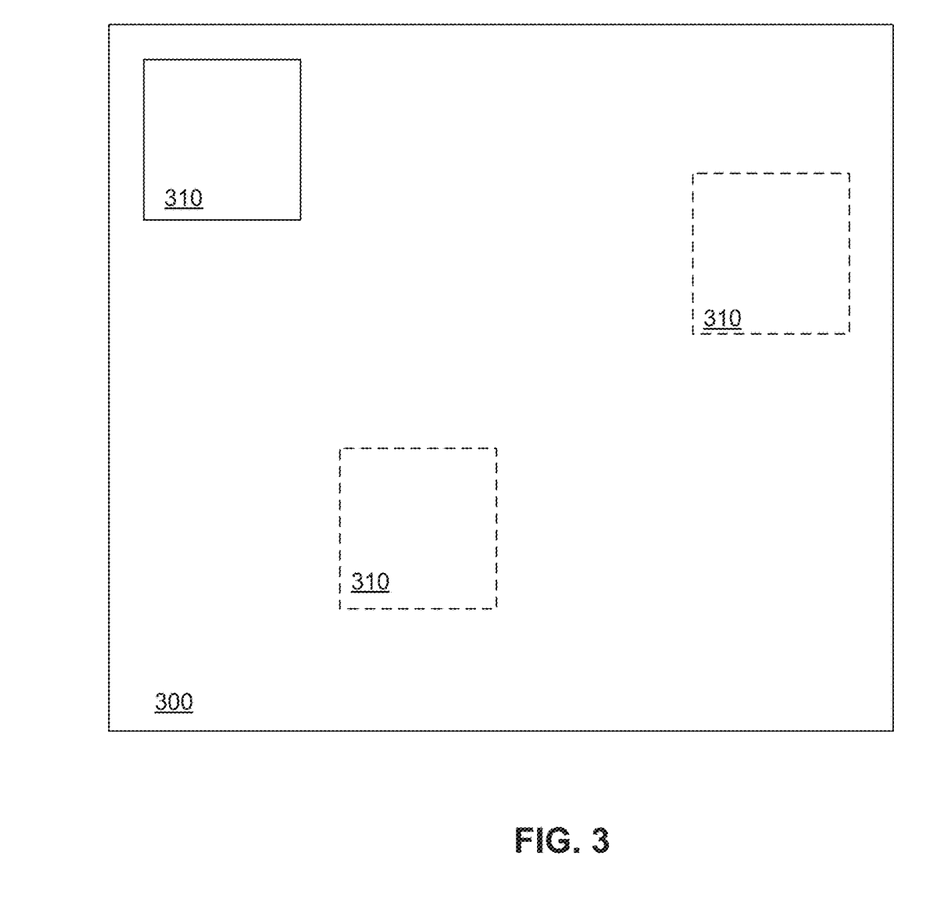
FIG. 3 is a diagram illustrating an example of a dual-mode zoom feature of the SPIDER zoom apparatus of FIGS. 2A-2B, according to certain aspects.

FIG. 3 is a diagram illustrating an example of a dual-mode zoom feature of the SPIDER zoom apparatus 210 of FIGS. 2A-2B, according to certain aspects. The SPIDER zoom apparatus 210, as described above, includes two sets of arrays of optical sensors (e.g., blades), which allows dual-mode zooming. A larger field-of-view image 300 can be formed by the small blades 230 of FIG. 2A and a smaller field-of-view image 310 can be formed by the large blades 220 of FIG. 2A. The larger field-of-view image 300 is a low-resolution image, whereas the smaller field-of-view image 310 is a high-resolution image formed on the larger field-of-view image 300. In some aspects, the high-resolution image 310 can be formed by zooming on various points of the scene and its location on the low-resolution image 300 can be an indicator of a position of a spot on the scene that is zoomed at relative to the entire scene as shown in the low-resolution image 300. The mechanism for changing the location of (e.g., steering) the high-resolution (e.g., spotlight) image 310 within the low-resolution image 300 is discussed in more details herein. It is understood that the dual-mode zoom feature as shown in FIG. 3 corresponds to a SPIDER zoom apparatus that includes multiple small blades in between each two consecutive large blades.

Figure 4A:
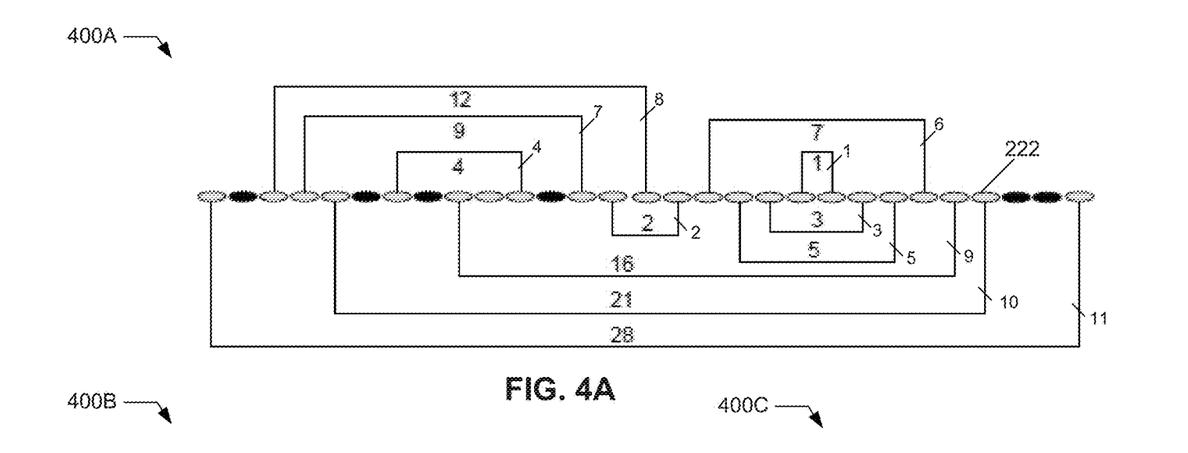
FIGS. 4A through 4C are a diagram illustrating an example of a baseline arrangement of high-resolution blades of the SPIDER zoom apparatus of FIGS. 2A-2B and corresponding data tables, according to certain aspects.
Figure 4B:
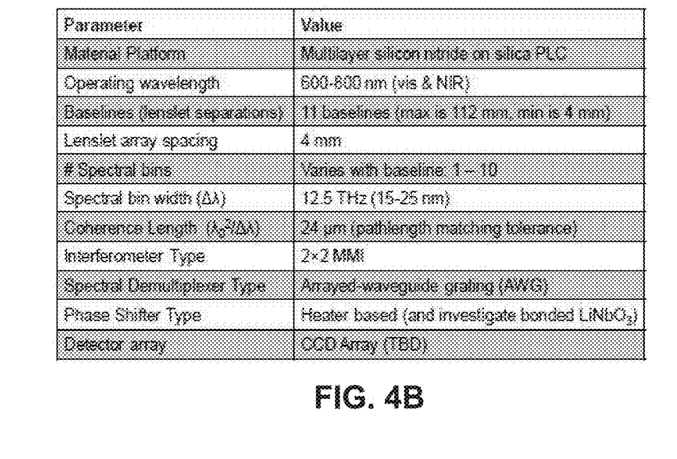
Figure 4C:
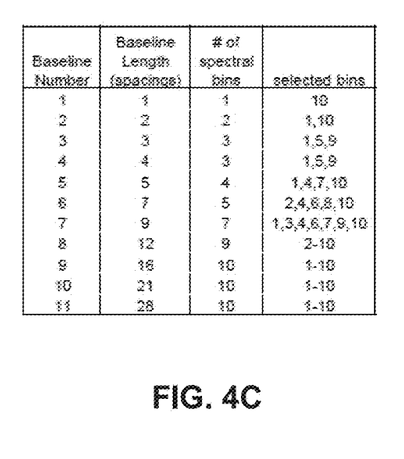

FIGS. 4A through 4C are a diagram illustrating an example of a baseline arrangement 400A of high-resolution blades of the SPIDER zoom apparatus 210 of FIGS. 2A-2B and corresponding data tables 400B and 400C, according to certain aspects. The optical elements (e.g., lenslets) 222 of each optical array 220 of FIG. 2A can be sampled in pairs. The pairs of lenslets can have different baseline lengths (e.g., separation), as shown for example, for baselines 1 through 11, in FIG. 4A. In one or more aspects, the baseline arrangement can be different from the baseline arrangement 400A, in terms of the selection of the pairs of lenslets and their respective baseline lengths. The baseline lengths are to be different for different selected pairs of lenslets.

Table 400B shows example parameters and corresponding example values for the parameters for an optimized SPIDER zoom apparatus. Examples of the parameters include material platform, operating wavelength, baseline lengths, lenslet array spacing, number of spectral bins (e.g., 12.5 THz wide bins), spectral bin width, coherent length, interferometer type, and other parameters as shown in the Table 400B.

Table 400C shows example baseline numbers of the baseline arrangement 400A, corresponding baseline lengths, number of spectral bins, and selected bins.

Figure 5A:
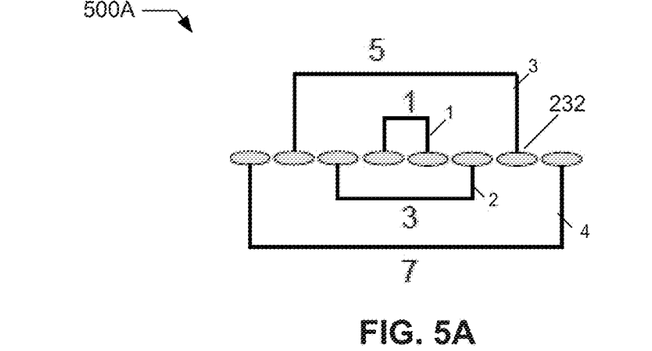
FIGS. 5A through 5C are a diagram illustrating an example of a baseline arrangement of low-resolution blades of the SPIDER zoom apparatus of FIGS. 2A-2B and corresponding data tables, according to certain aspects.
Figure 5B:
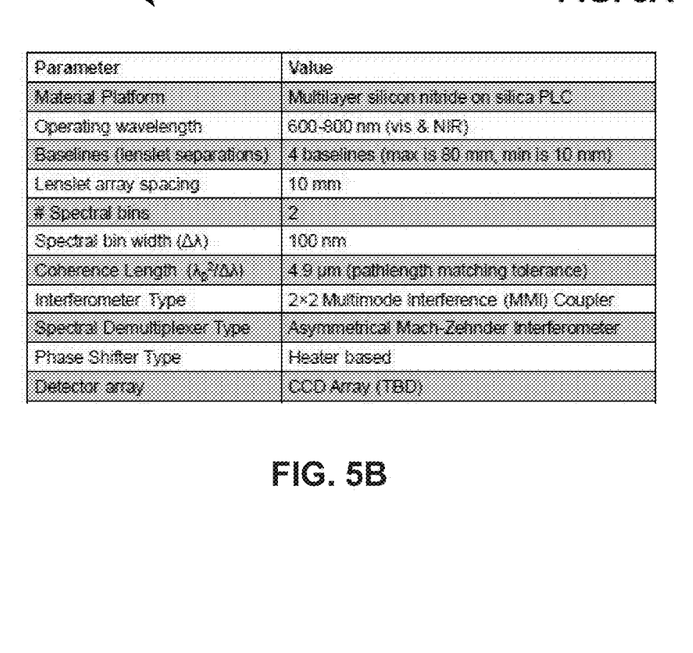
Figure 5C:
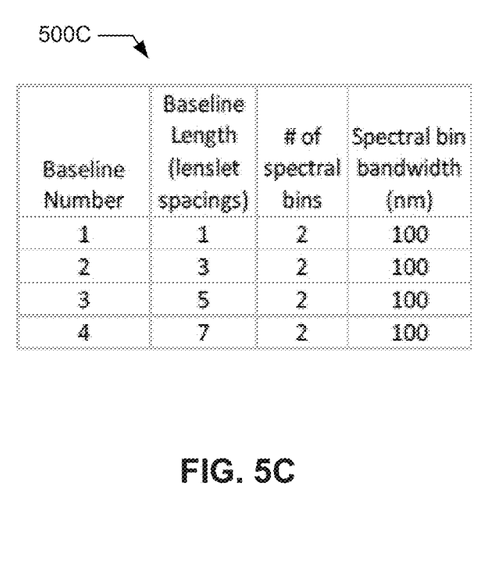

FIGS. 5A through 5C are a diagram illustrating an example of a baseline arrangement 500A of low-resolution blades 230 of the SPIDER zoom apparatus 210 of FIGS. 2A-2B and corresponding data tables 500A and 500B, according to certain aspects. The optical elements (e.g., lenslets) 232 of each optical array 230 of FIG. 2A can be sampled in pairs. The pairs of lenslets can have different baseline lengths (e.g., separation), as shown for example, for baselines 1 through 4, in FIG. 5A. In some aspects, the baseline arrangement can be different from the baseline arrangement 500A, in terms of the selection of the pairs of lenslets and their respective baseline lengths. The baseline lengths are to be different for different selected pairs of lenslets.

Table 500B shows example parameters and corresponding example values for the parameters for an optimized SPIDER zoom apparatus. Examples of the parameters include material platform, operating wavelength, baseline lengths, lenslet array spacing, number of spectral bins, spectral bin width, coherent length, interferometer type and other parameters as shown in the Table 500B.

Table 500C shows example baseline numbers of the baseline arrangement 500A, corresponding baseline lengths, number of spectral bins, and selected bins.

Figure 6:
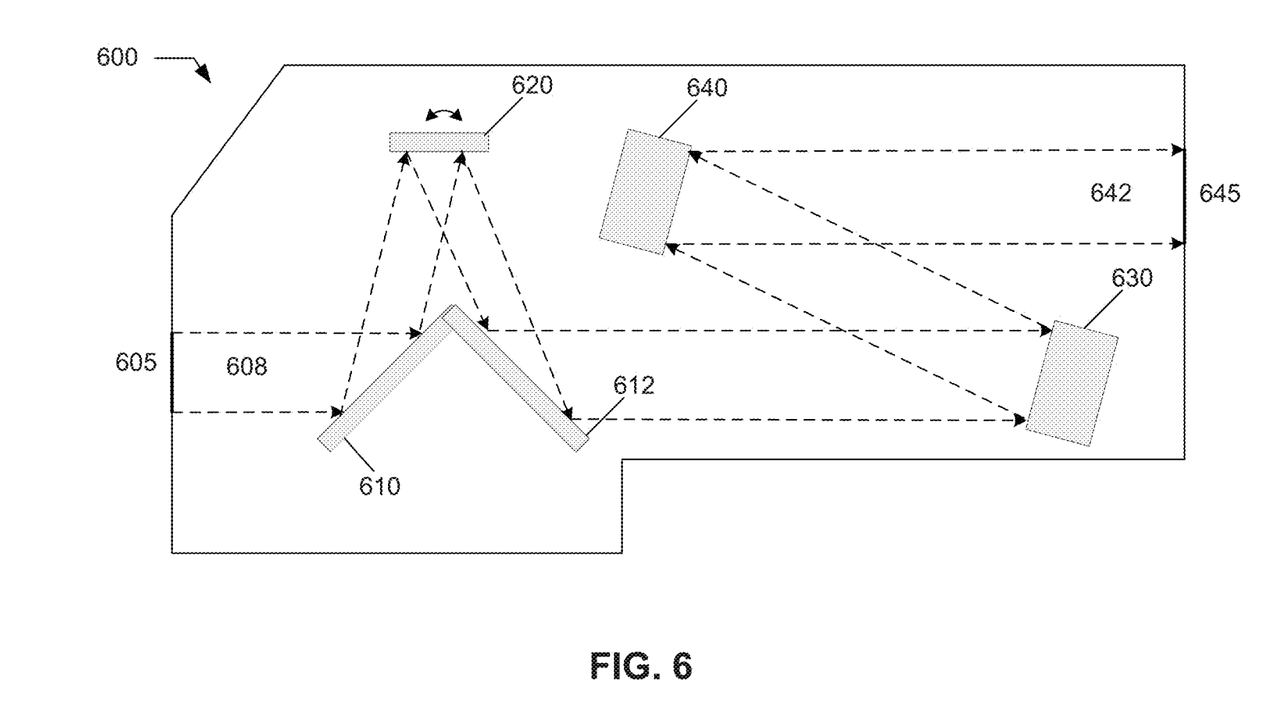
FIG. 6 is a conceptual diagram illustrating a side-view of an example of lenslet assembly, according to certain aspects.

FIG. 6 is a conceptual diagram illustrating a side-view of an example of lenslet assembly 600, according to certain aspects. In some aspects, the lenslet assembly 600 shows the structure of the lenslet 222 of the large blade 220 of FIG. 2A that allows steering of a first (e.g., high-resolution) image formed by the large blades 220 across a second (e.g., low-resolution) image formed by the small blades 230 of FIG. 2A. The lenslet assembly 600 includes a steering mirror portion including mirrors 610, 612, and 620 and lenses 630 and 640. An incident light beam 608 enters the lenslet assembly 600 from an input port 605 at a left side of the lenslet assembly 600, which is the top side as the lenslet assembly 600 is positioned in the SPIDER zoom apparatus 210, as shown in the top view 200A and the 3-D view 200B of FIGS. 2A and 2B. The output light 642 exits from an exit port 645 at a right side of the lenslet assembly 600, which would be a bottom side as it is positioned in the SPIDER zoom apparatus 210. The mirrors 610, 612, and 620 are flat mirrors such as MEMS steering mirrors that are used to steer the incident light beam 608, for example, by tilting mirror 620. The MEMS steering mirrors steerable provide a high-resolution spotlight mode while maintaining a desired path length control. The lenses 630 and 640 direct the light coming from the steering mirrors (e.g., 610, 612, and 620) to the waveguides in a photonic integrated circuit (PIC). In some aspects, the lenses 630 and 640 are off-axis parabolic mirrors.

Figure 7A:
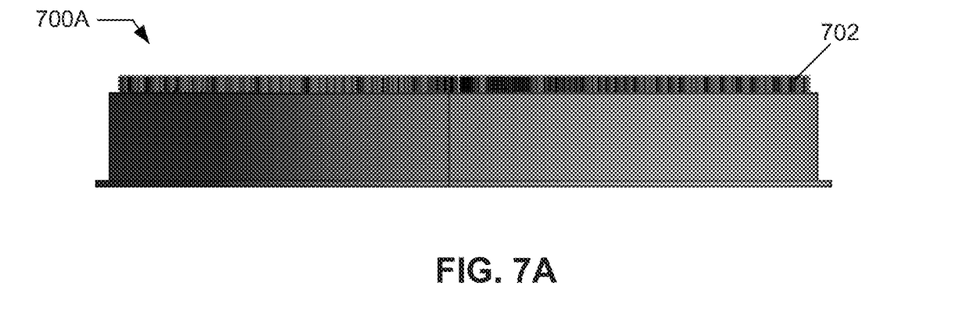
FIGS. 7A-7B are diagrams illustrating a side-view of a radial blade and assembly components of an example the SPIDER, according to certain aspects.
Figure 7B:
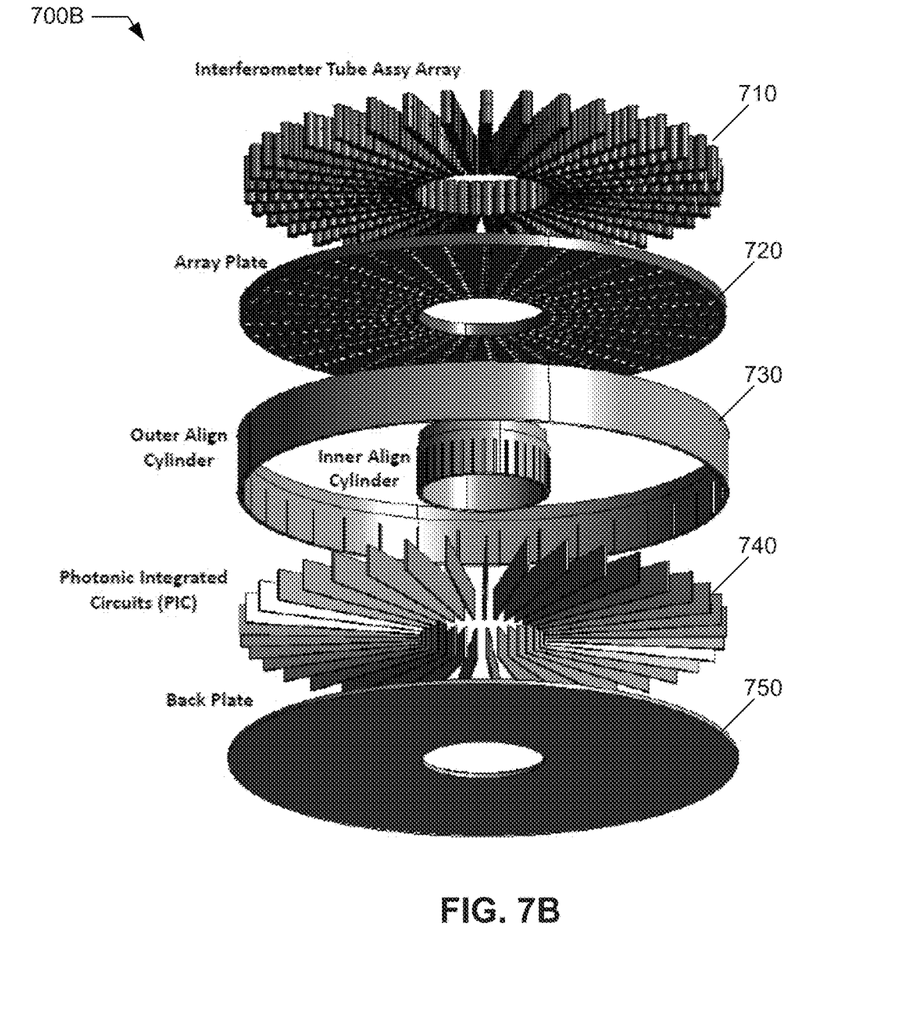

FIGS. 7A-7B are diagrams illustrating a side-view 700A of a radial blade 702 and assembly components of an example SPIDER apparatus 700B, according to certain aspects. The example SPIDER apparatus 700B, as shown in FIG. 7B is a flat panel telescope with no large optic components and can provide a large field-of-view without using precision gimbals for line of sight steering. In some aspects, the radial blade 702, as shown in the side view 700A, is the large blade 220 of FIG. 2A. The Assembly components 710, 720, 730, 740, and 750 are components of a SPIDER 100A of FIG. 1A, and do not show the small blades 230 of FIG. 2A or 2B. The blade section 710 shows just the large blades 702. Although the small blades are not shown in FIG. 7B, any number of small blades (e.g., 230) can be included in the assembly to add the zoom feature of the subject technology. In one or more aspects, the number of the small blades added between each two consecutive large blades depends on the desired resolution of the low-resolution image, and increasing the number of small blades enhances the size of the low-resolution (e.g., larger field-of-view) image. In some aspects, there are 37 blades 702 in the assembly, each blade 702 including 14 lenslets. The array plate 720 is, for example, a metallic plate that supports the blade section 710 and includes radial rows of holes corresponding to the exit ports (e.g., 645 of FIG. 6) of the lenslets (e.g., 600 of FIG. 6) of the blades 710 for the output light of the lenslets to pass through. In one or more aspects, cylinders 730 have slots for PICs 740 to be positioned in and be aligned with the rows of holes of the array plate 720. The PICs 730 include waveguides with equal lengths, through which the output light from the lenslets travel for interferometric imaging, as described in more details herein. In some aspects, the PICs 730 include other optical/electronic circuits for processing the optical signals from the waveguides. The back plate 750 is a structural base of the SPIDER apparatus that supports the entire assembly.

Figure 8:
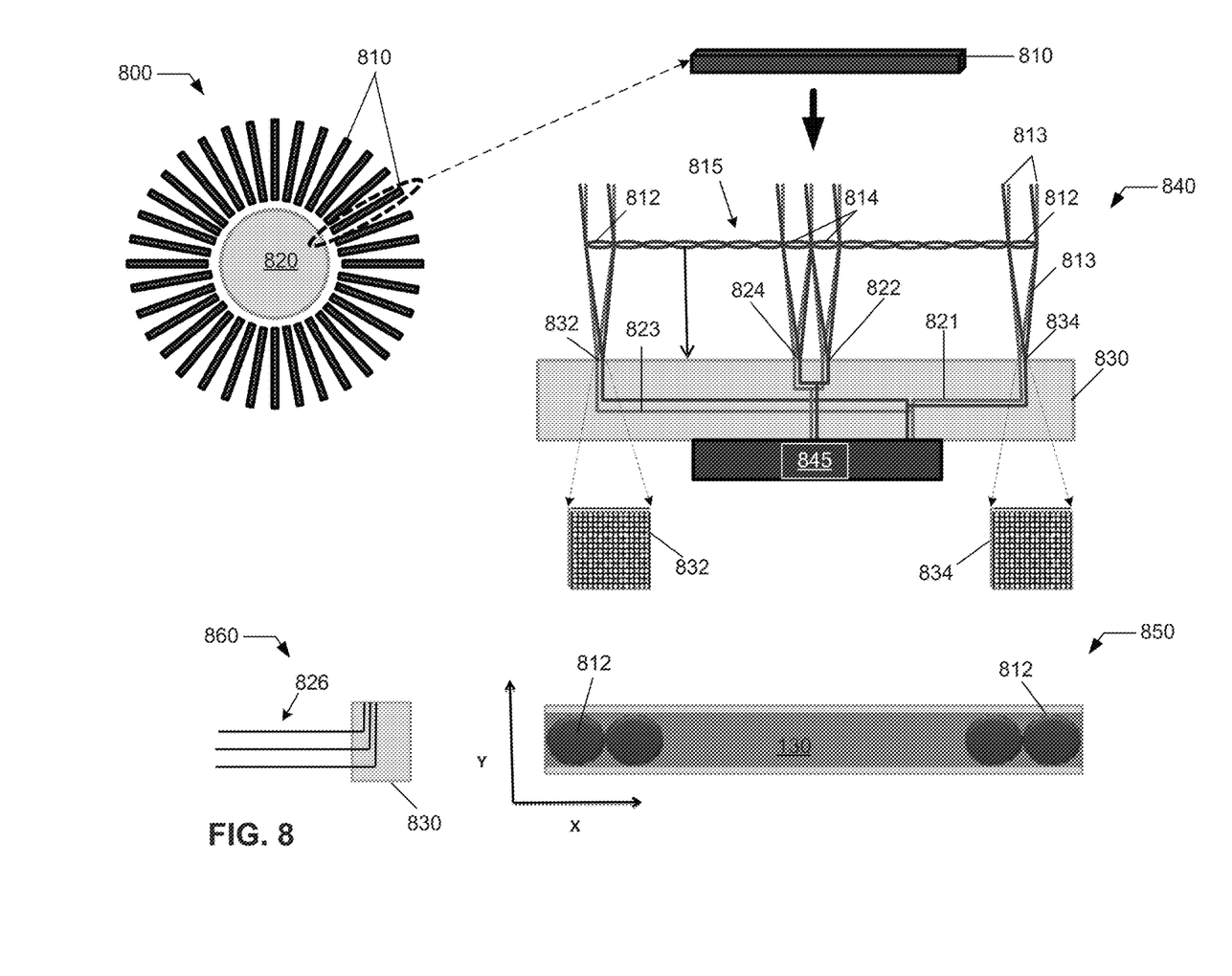
FIG. 8 is a conceptual diagram illustrating an example apparatus for interferometric imaging, according to certain aspects.

FIG. 8 is a conceptual diagram illustrating an example apparatus for interferometric imaging, according to certain aspects. Apparatus 800 may be a SPIDER including a large number of (e.g., thousands) sensor arrays 810 and one or more optical processors 820. Each sensor array 810 is an interferometric imaging device including an array 815 of optical elements (e.g., lenslets), substrate 830 enclosing a number of wave-guide-arrays (WGAs). (e.g., 832 or 834), and an optical processor 845. The array 815 may be a linear array including a large number of (e.g., 800 or more) optical elements (e.g., 812 or 814) or, in one aspect, may include one or more linear arrays of optical elements. Each optical element may focus light rays to a number of waveguides, such as the wave guides of a WGA. For example, optical element 812 may concentrate light rays 813 to the WGA 834. The waveguides of each WGA may have vertical and horizontal paths (e.g. 821) in substrate 830.

As shown in the cross sectional view 840 of sensor array 810, the array 815 of optical elements may be positioned at a distance (e.g., the focal length of lenslets, for example, 1 cm) from the substrate 830. In one aspect, the sensor array 810 may be integrated into the substrate 830 and even formed on or built into the substrate 830 (e.g., including a transparent material such as glass or transparent polymers). Lenslets of the sensor array 810 may typically have the same features such as the same size (e.g., 1 mm diameter), the same focal length (e.g., 1 cm), and equal F-stop values (e.g., f/10). In some aspects, the lenslets of the sensor array 810 may have features that are not the same. Substrate 830 may be a silicon substrate. In some aspects, substrates based on other semiconductor materials can also be used.

In order to enable interferometric imaging, the optical elements may be used in pairs. For example, optical elements 812 may form a pair and optical elements 814 may form another pair. In an aspect, for an N-element senor array with element numbers 1, 2, 3 . . . N, optical element pairs such as (1, N), (2, N−1), (3, N−2) and the like, may be formed, although other pairing arrangements may also be used. Each pair of optical elements may be coupled to a respective pair of WGAs. For example, as shown in FIG. 8, optical elements pair 812 are coupled to a pair of WGAs, e.g., 832 and 834 (which are also shown in exploded view), and optical elements pair 814 is coupled to another pair of WGAs, i.e., 822 and 824. In some aspects, the two waveguides of the paired waveguides (e.g., 832 and 834) form an interferometer and can sample an object of interest at desired spatial frequencies sufficient to form an image and is adapted to measure a visibility amplitude and phase in a pupil plane (as opposed to a focal plane).

Still refereeing to FIG. 8, it is important to note that waveguides of a pair of WGAs, such as waveguides 821 and 823 of WGAs 832 and 834, respectively, have the same path length in substrate 830 before the point where they are combined to enter optical processor 845. It is understood that WGAs such as WGAs 832 and 834 may include a large number (e.g., 200×200) of waveguides (e.g., silicon on insulator (SOI) waveguides) with a few μm (e.g., 10) channel size, but for simplicity, only one waveguide (e.g., 821 and 823) of each WGA are shown. Although each WGA (e.g., WGA 832) is coupled to a lenslet (e.g., lenslet 812), but each waveguide of the WGA may view the lenslet at a different view angle, and therefore may have a unique contribution to forming an image. As seen from the side view 840, waveguides of WGAs (e.g., waveguides 821 and 823) may travel vertically (e.g., perpendicular to the plane of the substrate) in one or more portion of their path. Variation in the separation of the pair of waveguides results in a phase shift which is utilized by a correlator of an optical processor 845 to collect complex visibility data to form an image.

The output optical signals from optical processor 845 may couple to some external waveguide (e.g., 826 in end view 860), such as optical fibers, before finally coupling to optical processor 820. In some aspects, optical processor 845 may include one or more opto-electronic processors and generate electrical output signals. Optical processor 845 may be integrated with the substrate 830 either by forming optical processor 845 over substrate 830 or via packaging. Optical processor 820 may include optical, opto-electronic, and electronic processing circuits and devices. Other hardware such as memory, firmware, as well as software may also be embedded in optical processor 820. In an aspect, the entire SPIDER 800 may be fabricated on a single chip (e.g., a 45 cm diameter silicon chip).

Figure 9:
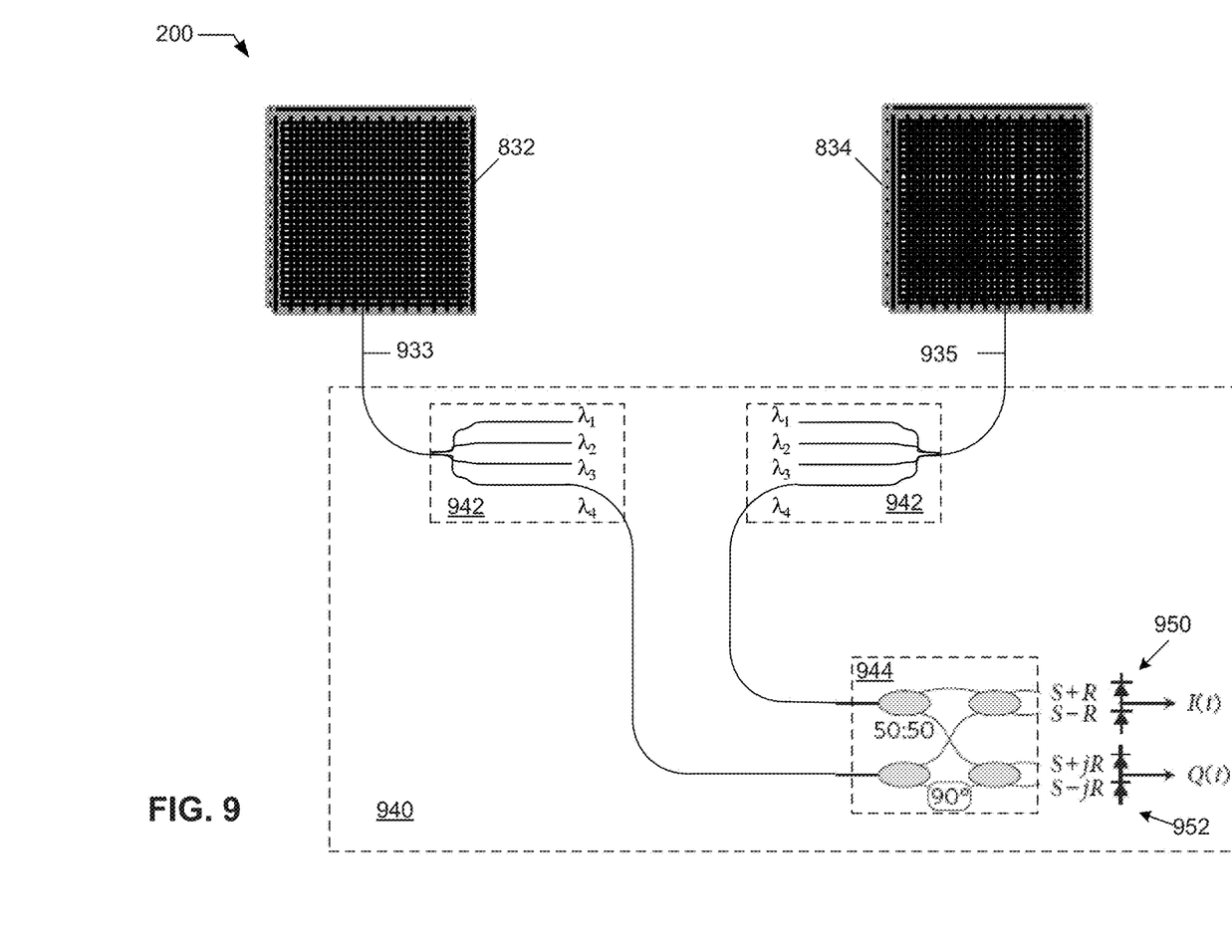
FIG. 9 is a conceptual diagram illustrating example waveguide arrays coupled an optical processor, according to certain aspects.

FIG. 9 is a conceptual diagram illustrating example waveguide arrays 832 and 834 coupled an optical processor 940, according to certain aspects. The optical processor 940 is an embodiment of optical processor 845 of FIG. 8. Example pair of waveguides 933 and 935 of WGAs 832 and 834 is coupled to optical processor 940. Optical processor 940 may include a number of optical processing sub-modules, for example, demultiplexers (demux) 942, optical quadrature modulator 944, and detectors 950 and 952. Demux 942 may disperse optical signals from waveguides 933 and 935 into multiple spectral bins (e.g., with wavelength $\lambda_1, \lambda_2, \lambda_3, \lambda_4$). The dispersed signals may be processed, for example, in the optical quadrature modulator 944, and converted to electrical in-phase (I) and quadrature (Q) signal by the detectors (e.g., photodiodes) 950 and 952. The I and Q signals may be further processed by the optical processor 940 (further processing not shown for simplicity) or sent to optical processor 820 of FIG. 8.

Figure 10:
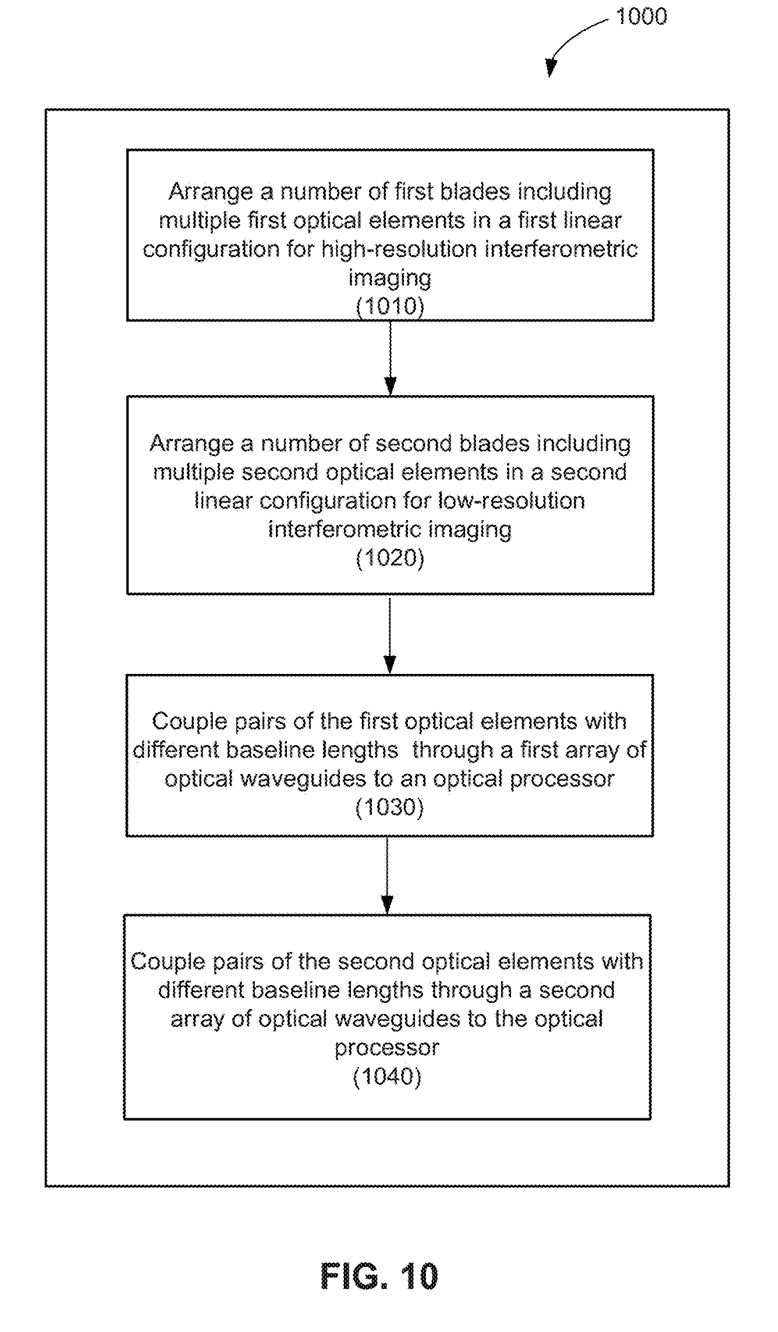
FIG. 10 is a flow diagram illustrating an example method for providing a compound-zoom imaging device, according to certain aspects.

FIG. 10 is a flow diagram illustrating an example method 1000 for providing a compound-zoom imaging device (e.g., 210 of FIG. 2A), according to certain aspects. The method 1000 begins at operation 1010, where a number of first blades (e.g., 220 of FIG. 2A) including multiple first optical elements (e.g., 222 of FIG. 2A) are arranged in a first linear configuration for high-resolution interferometric imaging. A number of second blades (e.g., 230 of FIG. 2A) including multiple second optical elements (e.g., 232 of FIG. 2A) are arranged in a second linear configuration for low-resolution interferometric imaging (1020). Pairs of the first optical elements (e.g., 222 of FIG. 4A) with baselines (e.g., 1, 2, 3 . . . 11 of FIG. 4A) of different lengths are coupled through a first array of optical waveguides (e.g., 821 and 823 of FIG. 8) to an optical processor (e.g., 845 of FIG. 8 or 940 of FIG. 9) (1030). Pairs of the second optical elements (e.g., 232 of FIG. 5A) with baselines (e.g., 1, 2, and 4 of FIG. 5A) of different lengths are coupled through a second array of optical waveguides (e.g., 232 of FIG. 5A) with different baseline (e.g., similar to 821 and 823 of FIG. 8) to the optical processor (1040).

In some aspects, the subject technology is related to advanced sensors, optical components, photonics and optical computing, information fusion, nano-photonics, electro-optical (EO) sensors, unmanned aerial vehicles, space situational awareness, persistent surveillance, reconnaissance, imaging, fiber coupled interferometers, synthetic apertures, and low size, weight, and power requirements. In some aspects, the subject technology may be used in various markets, including for example and without limitation, aerospace markets, electro-optical sensor markets, and optical and imaging markets.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A device for combined-zoom interferometric imaging, the device comprising:
   a plurality of first blades including multiple first optical elements arranged in a first linear configuration for high-resolution interferometric imaging; and
   a plurality of second blades including multiple second optical elements arranged in a second linear configuration for low-resolution interferometric imaging,
   wherein:
   pairs of the first optical elements with different baseline lengths are configured to be coupled through a first array of optical waveguides to an optical processor, and
   pairs of the second optical elements with different baseline lengths are configured to be coupled through a second array of optical waveguides to the optical processor.

2. The device of claim 1, wherein the first optical elements comprise a plurality of first lenslets, wherein a lenslet of the plurality of first lenslets is adapted to focus light into an optical waveguide of the first array of optical waveguides.

3. The device of claim 2, wherein the lenslet of the plurality of first lenslets comprises a mirror assembly configured to facilitate steering a first image formed by the plurality of first blades across a second image formed by the plurality of second blades, wherein the first image is formed with a smaller filed-of-view and a higher resolution compared to the second image.

4. The device of claim 1, wherein the second optical elements comprise a plurality of second lenslets, wherein a lenslet of the plurality of second lenslets is adapted to focus light into an optical waveguide of the second array of optical waveguides.

5. The device of claim 1, wherein a blade of the plurality of first blades is longer than a blade of the plurality of second blades.

6. The device of claim 1, wherein multiple blades of the plurality of second blades are configured to be positioned between two blades of the plurality of first blades.

7. The device of claim 6, wherein the blades of the plurality of second blades are configured to be positioned in a peripheral region of an assembly of the plurality of first blades and the plurality of second blades.

8. The device of claim 1, wherein the first array of optical waveguides and the second array of optical waveguides are fabricated on a substrate, and wherein the substrate comprises at least one of a glass or a semiconductor material.

9. The device of claim 8, wherein the optical processor is integrated with the first array of optical waveguides and the second array of optical waveguides, and wherein one or more portions of a path of a waveguide the first array of optical waveguides and the second array of optical waveguides run in a direction substantially perpendicular to a plane of the substrate.

10. The device of claim 9, wherein optical signals from two waveguides of paired waveguides of the first and second array of optical waveguides are combined where coupling to the optical processor.

11. The device of claim 10, wherein the two waveguides of the paired waveguides of the first and second array of optical waveguides form an interferometer and can sample an object of interest at desired special frequencies and is adapted to measure a visibility amplitude and phase in a pupil plane.

12. An apparatus for compound-zoom interferometric imaging, the apparatus comprising:
   a plurality of first sensor arrays configured to provide a high-resolution image;
   a plurality of second sensor arrays configured to provide a low-resolution image; and
   an optical processor configured to process optical signals receivable from the plurality of the first and the second sensor arrays,
   wherein:
   a sensor array of the plurality of first sensor arrays comprises a plurality of first optical elements arranged in a first linear configuration,
   a sensor array of the plurality of second sensor arrays comprises a plurality of second optical elements arranged in a second linear configuration,
   pairs of optical elements with different baseline lengths of sensor arrays of the plurality of first sensor arrays are configured to be coupled through a first array of optical waveguides to the optical processor, and
   pairs of optical elements with different baseline lengths of sensor arrays of the plurality of second sensor arrays are configured to be coupled through a second array of optical waveguides to the optical processor.

13. The apparatus of claim 12, wherein an optical element of the plurality of first optical elements is adapted to focus light into an optical waveguide of the first array of optical waveguides, and wherein an optical element of the second plurality of optical elements is adapted to focus light into an optical waveguide of the second array of optical waveguides.

14. The apparatus of claim 13, wherein the optical element of the plurality of first optical elements comprises a mirror assembly configured to facilitate steering a first image formed by the plurality of first sensor arrays across a second image formed by the plurality of the second sensor arrays, wherein the first image is formed with a smaller filed-of-view and a higher resolution compared to the second image.

15. The apparatus of claim 12, wherein an array of the plurality of first sensor arrays is longer than an array of the plurality of second sensor arrays.

16. The apparatus of claim 12, wherein an array of the plurality of first sensor arrays forms a first blade and an array of the plurality of second sensor arrays forms a second blade, wherein second blades are configured to be positioned to partially fill a gap between two consecutive first blades at a periphery of the apparatus.

17. The apparatus of claim 12, wherein the first array of optical waveguides and the second array of optical waveguides are formed on a substrate, and wherein the substrate comprises at least one of a glass or a semiconductor material.

18. A method for providing a compound-zoom imaging device, the method comprising:

arranging a plurality of first blades including multiple first optical elements in a first linear configuration for high-resolution interferometric imaging;

arranging a plurality of second blades including multiple second optical elements in a second linear configuration for low-resolution interferometric imaging;

configuring pairs of the first optical elements with different baseline lengths to be coupled through a first array of optical waveguides to an optical processor; and configuring pairs of the second optical elements with different baseline lengths to be coupled through a second array of optical waveguides to the optical processor.

19. The method of claim 18, further comprising facilitating steering a first image formed by the plurality of first blades across a second image formed by the plurality of second blades, wherein the first image is formed with a smaller filed-of-view and a higher resolution compared to the second image.

20. The method of claim 18, wherein a blade of the plurality of second blades is shorter in length than a blade of the plurality of first blades, and wherein arranging the plurality of second blades comprises positioning multiple blades of the plurality of second blades in between two consecutive blades of the plurality of first blades.

* * * * *